United States Patent [19]
Ayers et al.

[11] Patent Number: 6,009,273
[45] Date of Patent: Dec. 28, 1999

[54] METHOD FOR CONVERSION OF A VARIABLE ARGUMENT ROUTINE TO A FIXED ARGUMENT ROUTINE

[75] Inventors: Andrew E. Ayers, Amherst, N.H.; Jiyang Liu, Westford, Mass.

[73] Assignee: Hewlett-Packard Company, Palo Alto, Calif.

[21] Appl. No.: 08/953,549

[22] Filed: Oct. 21, 1997

Related U.S. Application Data

[60] Provisional application No. 60/047,866, May 29, 1997.

[51] Int. Cl.$^6$ ........................................ G06F 9/44
[52] U.S. Cl. .................. 395/709; 395/708; 395/704; 395/705; 712/226; 712/234; 712/241
[58] Field of Search .................................. 295/709, 708, 295/704, 705, 567, 580, 581, 588; 712/226, 233, 234, 241

[56] References Cited

U.S. PATENT DOCUMENTS

| | | | |
|---|---|---|---|
| 5,740,443 | 4/1998 | Carini | 395/705 |
| 5,854,933 | 12/1998 | Chang | 395/709 |

OTHER PUBLICATIONS

Kaser et al., "On the Conversion of Indirect to Direct Recursion," ACM Letters on Programming Languages and Systems, vol. 2, No. 1–4, pp. 151–164, Mar. 1993.

Frank Vahid, "Procedure Cloning: A Transformation for Improved System–Level Functional Partitioning," Proceedings of European Design and Test Conference, ED&TC 97, pp. 487–492, Mar. 1997.

Cooper et al., "Procedure Cloning," Proceedings of the 1992 International Conference on Computer Languages, pp. 96–105, Apr. 1992.

Cooper et al., "Unexpected Side Effects of Inline Substitution: A Case Study," ACM Letters on Programming Languages and Systems, vol. 1, No. 1, pp. 22–32, Mar. 1992.

*Primary Examiner*—Tariq R. Hafiz
*Assistant Examiner*—Tuan Q. Dam

[57] ABSTRACT

A compiler method analyzes a program listing to identify a first set of subroutines therein, each of which accepts a variable number of arguments, converting the first set of subroutines into further sets of subroutines which accept fixed numbers of arguments. The method includes the steps of: locating subroutines in the program listing which accept a variable number of arguments and identifying which thereof comprise a first set of subroutines that can be altered to a form which accepts a fixed number of arguments; for each subroutine identified as part of the first set, determining call sites which pass arguments to each subroutine and determining a number and kind of said arguments to be passed therefrom; partitioning call sites to each subroutine of the first set into one or more groups, each group comprising call sites which pass an identical number and kind of arguments to an associated subroutine of said first set; duplicating each subroutine of said first set into plural second sets of N corresponding subroutines, wherein N is equal to the number of groups associated with the subroutine of the first set, and revising each one of said N corresponding subroutines to receive a number of fixed arguments to be passed by call sites partitioned into an associated group; and substituting in the program listing the N corresponding subroutines and revising call sites in each group to refer to an associated one of said N corresponding subroutines.

8 Claims, 5 Drawing Sheets

FIG.1

"PRIOR ART"

METHOD FOR CONVERSION OF A VARIABLE ARGUMENT ROUTINE TO A FIXED ARGUMENT ROUTINE

This Application claims priority from U.S. Provisional patent application Ser. No. 60/047,866, filed May 29, 1997.

FIELD OF THE INVENTION

This invention relates to a method and apparatus for improving the performance of a computer program by optimizing certain subroutines within the program and more particularly, to a method for converting program subroutines which employ variable numbers of arguments to program subroutines which employ fixed numbers of arguments.

BACKGROUND OF THE INVENTION

Many programming languages provide a mechanism for indicating that a subroutine can accept a varying number of arguments at run time. For example, the C and C++ languages provide a mechanism commonly known as "varargs". Hereafter, the term "varargs" subroutine will be used to refer to a subroutine in any source language with this property. The C subroutine "printargs", shown below is an example of such a subroutine:

```
void printargs(int arg_cnt, ... )
{
    int i;
    va_list pvar;
    va_start (pvar, arg_cnt);
    for (i = 0; i < arg_cnt; i++) {
        printf("arg[%d] = %d\n", i, va_arg(pvar, int));
    }
    va_end(pvar);
}
```

Figure 1:
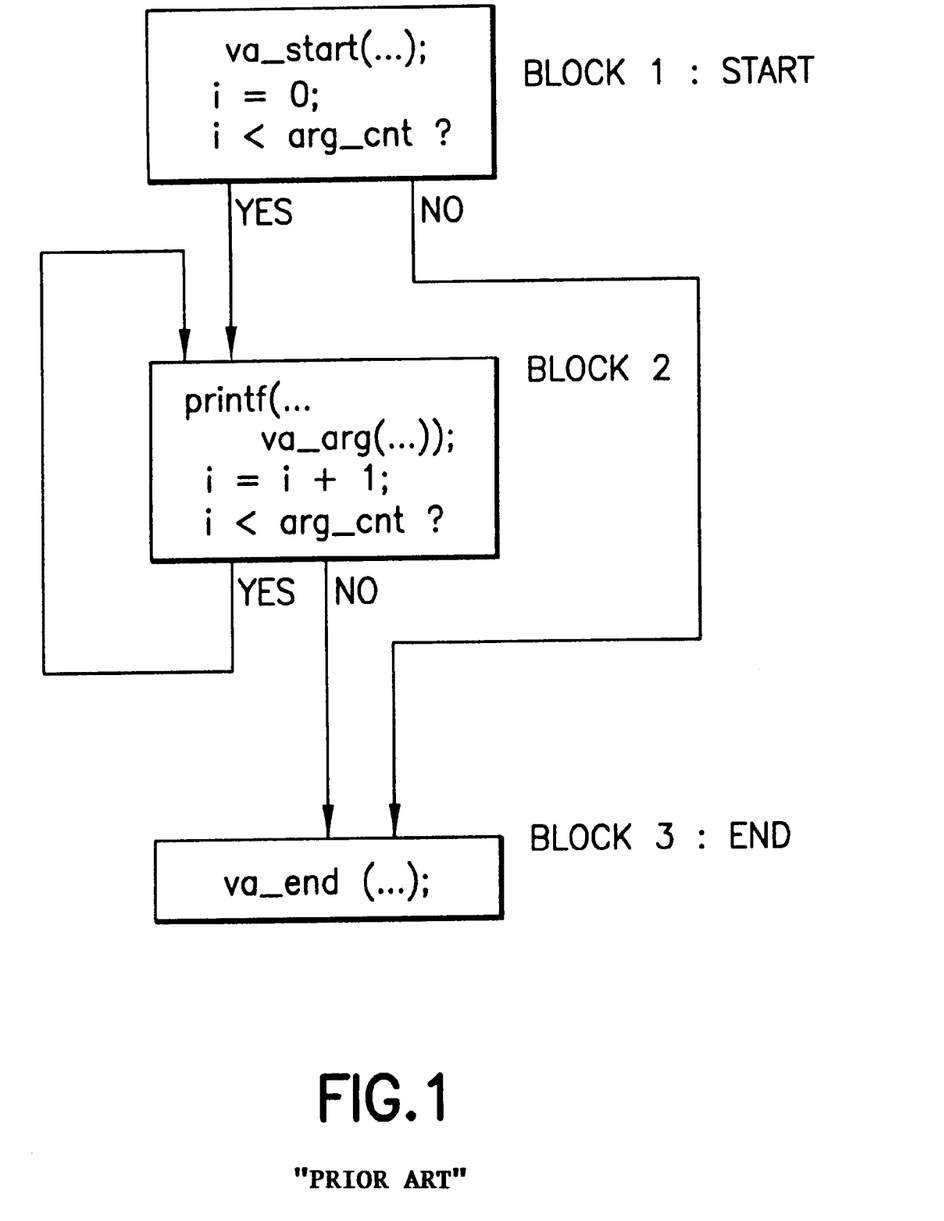
FIG. 1 is a logical flow graph of a varargs subroutine.

For those not familiar with the C language, the possible sequences of statements in the above subroutine is illustrated in FIG. 1. The subroutine "printargs" as shown therein, may be called at call sites which pass different numbers of integer-valued arguments to the subroutine (as in the sample calls shown below). A call site syntax provides the name of the called subroutine, followed by a first argument which defines the number of arguments to be passed by the call, followed by the argument(s) themselves:

| CALL SITE | EFFECT WHEN CALLED |
|---|---|
| 1: printargs(0); | (none) |
| 2: printargs(1,142); | arg[0] = 142 |
| 3: printargs(2,11,-22); | arg[0] = 11 |
|  | arg[1] = -22 |
| 4: printargs(1,99); | arg[0] = 99 |

A subroutine in C is described by a signature and a body. The signature is the first line of the subroutine, and describes the name of the subroutine, the return value of the subroutine, and the number, name, and type of each subroutine argument. For instance, the following signature int abc( int a, char b, double c )

describes a routine named "abc" which requires exactly three arguments from each caller. The first argument "a" must be of integer type (i.e., "int"), the second argument "b" of character type (i.e., "char"), and the third argument "c" of double-precision floating-point type (i.e., "double"). Additionally, the subroutine abc returns a value of integer type to the caller.

Signatures, such as the one above that precisely specify the number and type of arguments the caller must pass, are called "fixedarg" signatures, and subroutines with such signatures are called "fixedarg subroutines". A fixedarg signature specifically identifies each argument that will be used by the fixedarg subroutine and enables the subroutine to refer to the argument by "name".

The signature is followed by a sequence of program statements which make up the body of the subroutine. The body encompasses all statements between an opening brace { and a closing brace }. The arguments named in the signature may be referred to (or accessed) in the body by using the argument name.

In the printargs subroutine (as shown in FIG. 1), the signature is:

void printargs( int arg_cnt, ... )

Such a signature indicates, by means of an ellipsis "...", in the argument description, that the subroutine will accept a varying number of arguments from its callers; that is, it is a varargs subroutine. It also names a single fixed argument of integer type which is required to be passed by all callers. In this case there is no name that refers to the other arguments. To determine the value of those arguments in the body of the subroutine, the programmer must employ special program statements. Those statements are "va_start", "va_arg", and "va_end". "Va_start" is an instruction to start with a first argument; "va_arg" is an instruction to move to a next argument; and "va_end" indicates that the subroutine is finished. Each appearance of one of these constructs in the subroutine body is termed a varargs access.

As shown in FIG. 1, the printargs subroutine commences at Block 1 with an integer count set to 0 and a test is made to determine if the count is less than the argument count indicated by the call. If yes, a next argument is accessed that has been passed from the call site and the procedure of the subroutine operates thereupon (Block 2). The integer count is incremented and if still less than the argument count, the procedure repeats with a next argument. Otherwise, the procedure ends (Block 3).

Calls to varargs subroutines often require more processing than calls to equivalent fixedarg subroutines, because the number of arguments is unknown (as is their type) and so may need to be moved from locations specified by the caller into locations expected by the callee. For instance, compilers for the Hewlett-Packard 700 and 800 series work stations use an extra instruction sequence known as an "argument relocation stub" that is interposed between caller and callee to move each varargs argument. The execution of these extra instructions makes a call to a varargs subroutine slower than a call to an equivalent fixedarg subroutine, Varargs subroutines can limit the effectiveness of interprocedural optimizations. For example, it is impossible to directly insert a varargs subroutine inline in a code listing, because inlining requires that each argument reference in the callee be identified with a particular argument in the caller. Varargs subroutines also do not allow accurate per-parameter information to be collected during interprocedural analysis.

Accordingly, there is a need for a compile procedure which improves the execution time of a program that includes vararg subroutines. Further, such a compile method, in replacing vararg subroutines with fixedarg subroutines, should avoid untoward code growth.

SUMMARY OF THE INVENTION

A method called "varargs subroutine cloning" is used to transform certain varargs subroutines into equivalent fixedarg subroutines. The term cloning, as used in this application, means a creation of a specialized instance of a subroutine that has identical behavior with the original subroutine, but can be processed more efficiently than the original. If it is possible to create such a specialized instance, the original varargs subroutine is called clonable and the specialized subroutine instances are called clones of the original subroutine.

The method of the invention first identifies clonable varargs subroutines; transforms such identified varargs subroutines into fixedarg clones; and then modifies calls to the original subroutines to calls to fixedarg clones instead, thereby removing the performance penalties associated with calls to varargs subroutines. The transformation enables further optimization steps. For instance, a fixedarg clone can be readily inlined, whereas it is not possible to inline the original varargs subroutine. Additionally, the use of varargs subroutines can lead to programming errors which are difficult to identify. By turning varargs subroutines into cloned fixedarg subroutines, the compiler can insert additional checking code to verify that the varargs feature is being used properly.

DETAILED DESCRIPTION OF A PREFERRED EMBODIMENT

Figure 3:
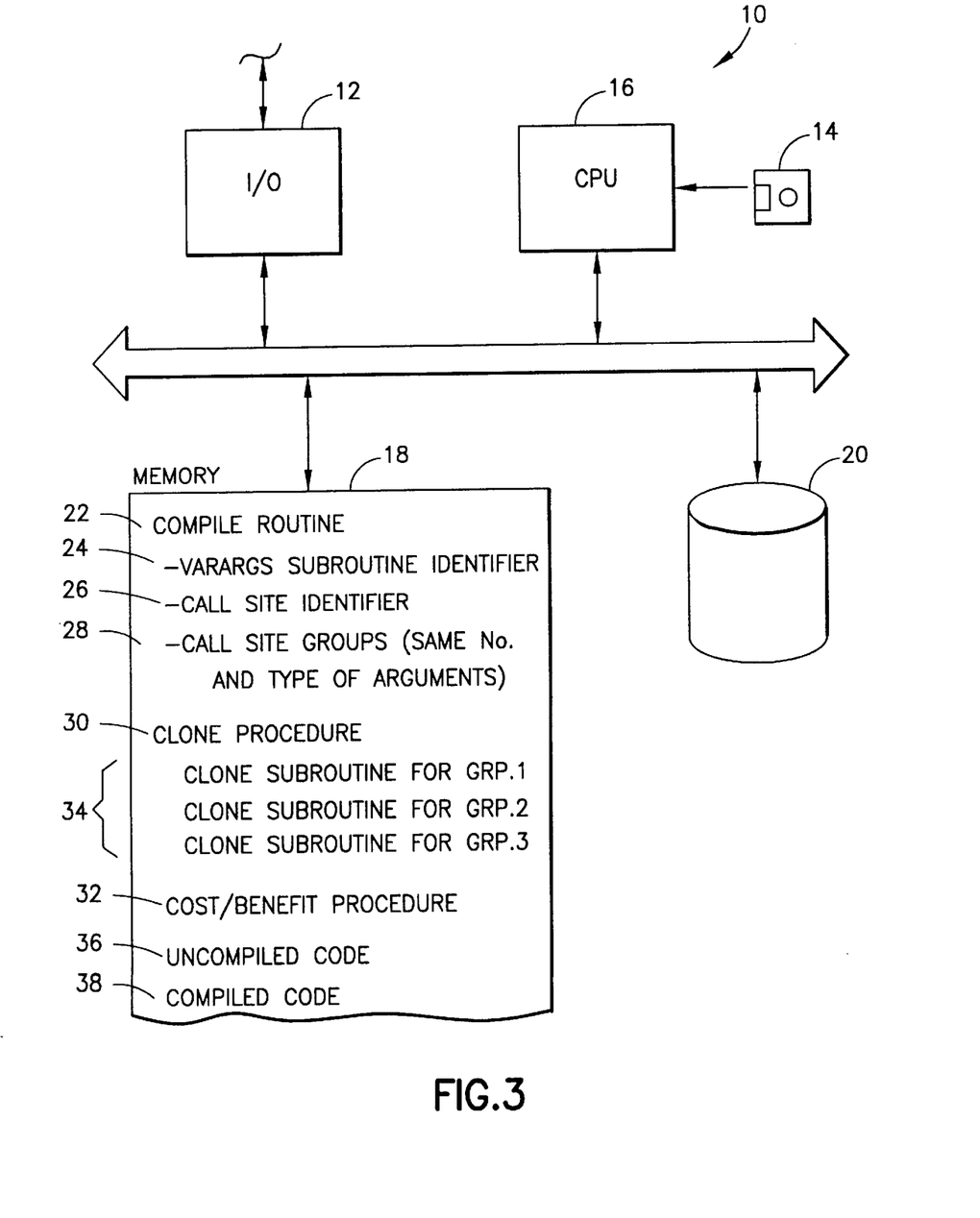
FIG. 3 is a high level block diagram illustrating components of a processor which enable the operation of the invention.

FIG. 3 illustrates a processor 10 which is adapted to perform the method of the invention. An uncompiled code listing is entered into processor 10 either via input/output module 12 or via a memory disk 14. Central processing unit (CPU) 16 controls the overall functioning of processor 10 and, in combination with the software routines contained in memory 18, performs the method of the invention.

A direct access storage device 20 is employed to store portions of the uncompiled and compiled code prior to and after processing by a compile routine 22 (contained within memory 18). Compile routine 22 includes a number of subprocedures that are utilized to carry out the method of the invention. More particularly, compile routine 22 includes a varargs subroutine identifier procedure 24 which enables identification of varargs subroutines in an uncompiled code listing; a call site identifier procedure 26 which enables identification of each call site with reference to each varargs routine; and a call site grouping procedure 28 which enables a partitioning into groups, of call sites which pass the same type and number of arguments to a particular varargs subroutine. Thus, if a particular varargs subroutine is to be accessed by plural call sites having 1, 2 and 3 arguments, respectively, those call sites which have one argument are segregated into one grouping; those having two arguments are segregated into a second grouping and those having three arguments into a third grouping.

Memory 18 further includes a clone procedure 30 which converts each clonable varargs subroutine into a fixedarg subroutine. A cost/benefit procedure 32 assesses whether a compiled code listing with the substitute, cloned fixedarg procedure provides operating improvement over the code listing with the varargs procedures.

If such a conversion is found to be cost effective, a cloned subroutine is created for each fixedarg group that is, in turn, created from the varargs subroutine. Those cloned subroutines are temporarily stored in area 34 of memory 18. Finally, regions 36 and 38 are reserved for storage of uncompiled code and compiled code, respectively.

There are two main components to the method of the invention. The first (i.e., "analysis" phase) identifies whether a subroutine is a varargs subroutine and, if so, whether it is clonable. The second (i.e., "transformation" phase) uses the results of the analysis phase to transform clonable varargs subroutines into fixedarg clones, and then modifies calls to the original subroutine to call clone subroutines instead. The method of the invention is preferably performed during a compile time when various optimization actions are applied to a program listing to improve its performance.

The analysis phase identifies clonable varargs subroutines by examining the signatures and the bodies of the subroutines in the program listing. Once the locations of varargs accesses (i.e., va_start, va_arg, va_end) in each varargs routine are identified, the clonability of each varargs subroutine is determined. This information is recorded in data structures called "varargs access descriptors". Before the analysis phase terminates, the varargs access descriptors are saved for later use by the transformation phase.

Most programming languages require that varargs subroutines be explicitly identified as such by a language construct. For example, in the C programming language, a varargs subroutine is indicated by an ellipsis ". . ." in the signature of the subroutine. Thus to recognize varargs subroutines, the compiler needs merely look for the ellipsis.

To recognize and locate varargs accesses, a search is made for particular statements, e.g., in the C language, there are three statements of interest: one that signals the start of a sequence of varargs accesses (va_start), one that indicates a reference to the next vararg (va_arg), and one that indicates that a particular sequence of varargs accesses has finished (va_end). These statements are readily located in the subroutine body by scanning the collection of statements that make up the body.

Once all the varargs accesses in a varargs subroutine are identified, the compiler determines if it is desirable to clone the varargs subroutine into a fixedarg subroutine. In principle, all varargs subroutines can be restructured into fixedarg subroutines. However, in many cases the restructuring will require large amounts of additional code to be added to the subroutine, causing what is known as excessive code growth. The compiler thus determines whether the potential gain in performance from elimination of the varargs will offset the negative effects of increased subroutine compilation time and increased subroutine size.

To further illustrate this point, consider a varargs subroutine like printargs (FIG. 1), where a single va_arg statement appears within a loop. On the first loop iteration, the va_arg statement returns the value of the first vararg argument; on the second iteration, the same va_arg statement returns the value of the second vararg argument, and so on. Because this single va_arg statement will refer to multiple, different vararg arguments, the subroutine is not clonable (as is) into a fixedarg subroutine. In other words, a vararg routine is not clonable unless each va_arg statement refers to a single vararg argument (or refers to varargs arguments beyond the number passed by a caller).

To restructure the original subroutine to make it clonable, the compiler peels off the first iteration of the loop, and thereby creates a total of 2 va_arg statements in the routine. Loop peeling is accomplished by adding statements to a program before the loop that duplicate the statements in the loop entry test and loop body, and then increasing the starting value of the loop counter (if any) by one. For example peeling one iteration from the loop in printargs gives the flow diagram of FIG. 2.

Figure 2:
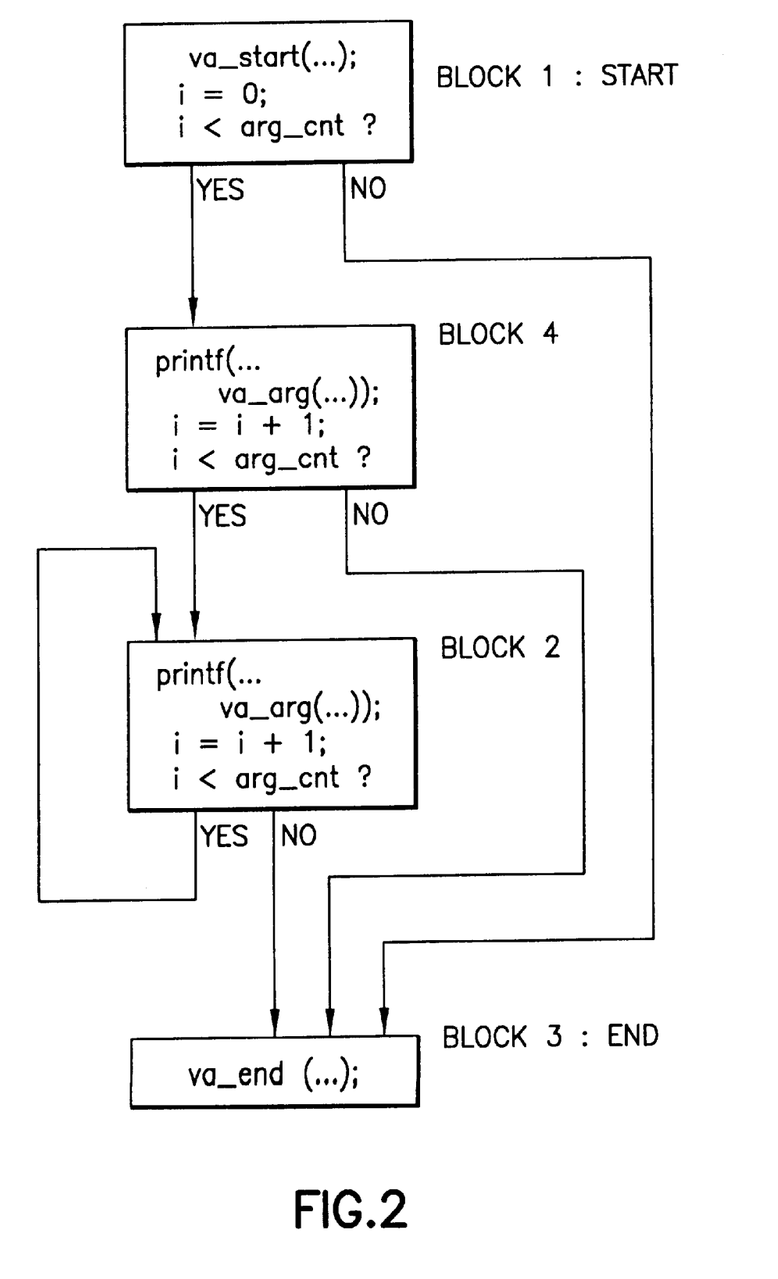
FIG. 2 is a logical flow graph of the varargs subroutine of FIG. 1, wherein one iteration of a loop therein has been "peeled".

Note that in the process of peeling one iteration, the statements in Block 2 are duplicated once, creating a new block, i.e., Block 4. If N iterations are peeled, the statements in the body of the loop will be duplicated N times. Thus, if the loop in the original subroutine is peeled N times, N va_arg statements appear outside the loop and can be identified as accessing the first N vararg arguments, respectively. The N+1st va_arg statement will remain within the loop and will access all remaining vararg arguments. Such a modified subroutine will be clonable when called from call sites that pass exactly N+1 arguments (1 fixed argument and N varargs).

Hereafter, a procedure will be described which identifies clonable varargs subroutines in the case where the compiler is capable of using loop peeling to restructure the original subroutine. In brief, and with reference to FIGS. 4a and 4b, the procedure works as follows. The procedure considers all possible sequences of executions of the statements in the subroutine body (all paths). For each of these, it initially determines if the subroutine has a varargs signature (box 50) and thus identifies each varargs subroutine. It then finds each varargs access in each vararg routine (box 52) and determines which varargs arguments are accessed by each va_arg statement in the program body (box 54).

As described above, a given va_arg statement may access zero, exactly one, or more than one varargs arguments. This information can be computed for a given va_arg statement by seeing which varargs argument is accessed on each path. Since no other paths are possible, the sum of the information about the varargs argument accesses over all paths completely describes the possible varargs references.

Figure 4A:
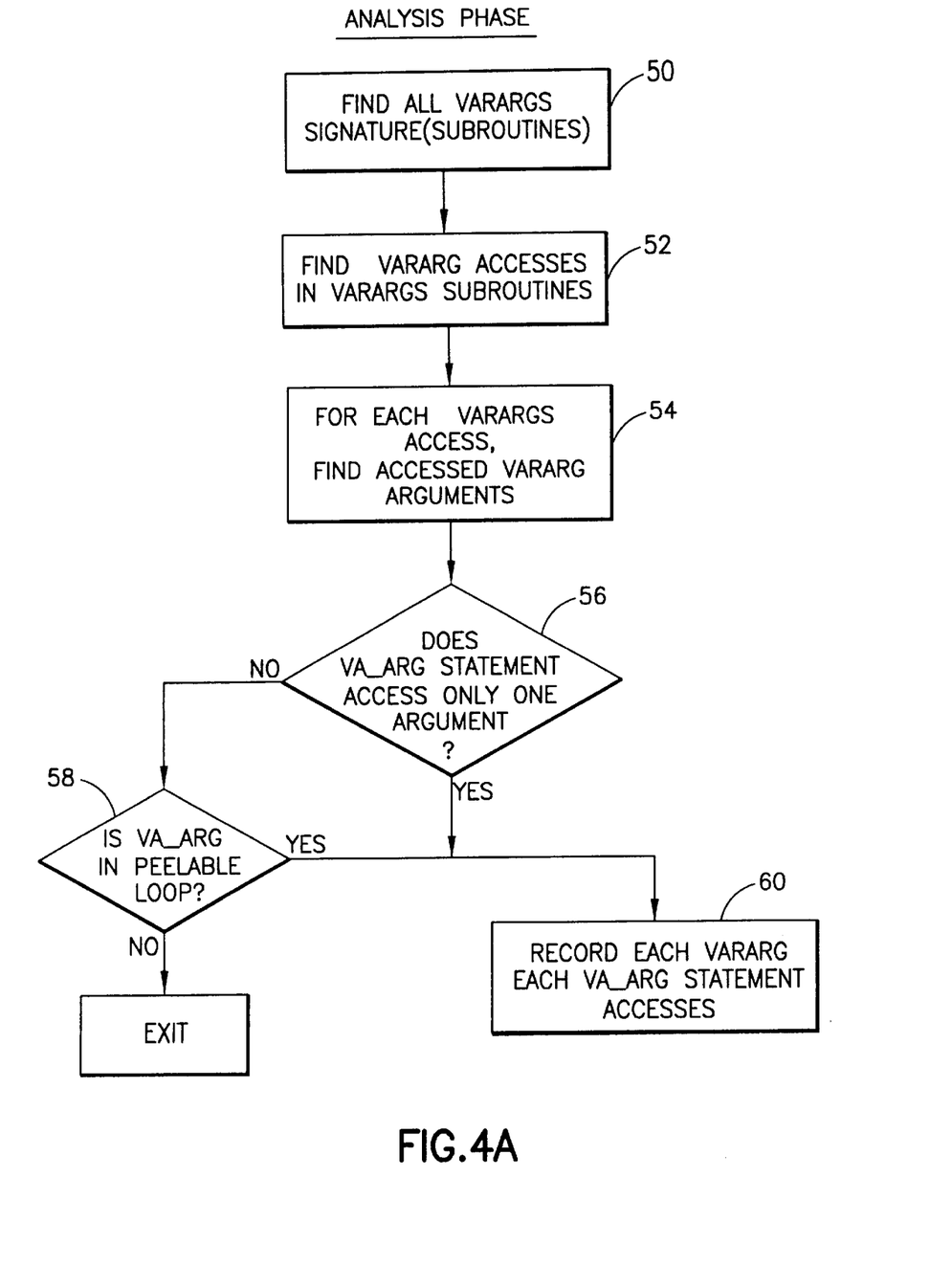
FIGS. 4A and 4B are logical flow diagrams which illustrate the method of the invention.

If it is determined from this analysis that all va_arg statements access exactly one varargs argument (decision box 56), or that those va_arg statements that access multiple varargs arguments appear inside a loop which can be peeled to create duplicate va_arg statements that access exactly one argument (decision box 58), then the subroutine is clonable. The information about which varargs argument each va_arg statement will access is recorded for later use (box 60). Otherwise the analysis portion of the procedure exits (box 62).

Next a transformation procedure commences (FIG. 4b), with each call site to a varargs routine being partitioned into a group in accordance with the number of arguments to be passed to it by the respective call site (box 64). More specifically, each call site which calls a specific varargs routine and passes one argument is placed in a first group. Each call site which calls the same specific varargs routine and passes two arguments is placed in a second group, etc.. When this partitioning is finished, a copy (clone) of the varargs subroutine is created for each group associated with a varargs subroutine (box 66). Each clone is then converted from a varargs subroutine to a fixedarg subroutine, where the number of fixedargs equals the number of args associated with the associated call site group (box 68).

Figure 4B:
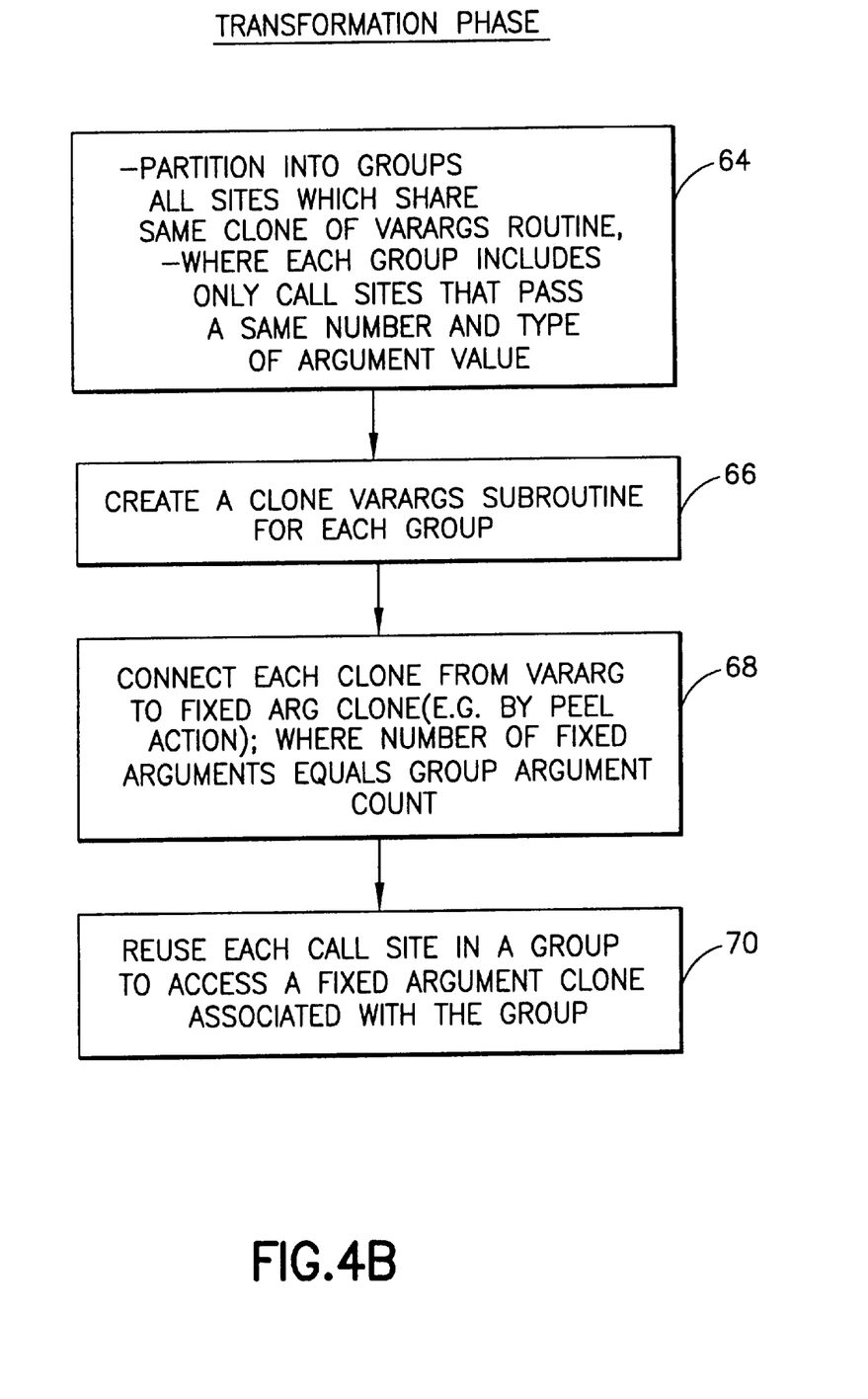

In the example to be described below, the conversion of a clone is accomplished by peeling each iteration of a loop and creating a fixedarg subroutine. At this point a fixedarg subroutine is associated with each call site group, with the fixedarg subroutine adapted to accept an identical number and kind of arguments from each of the call sites in the group. Next, each call site in each respective group is revised to call the cloned fixedarg subroutine associated with the group (box 70). Thus, each clonable varargs subroutine has now been replaced with a number of fixedarg subroutines and the respective call sites have been modified to refer to a fixedarg clone which will accept the number of arguments to be passed by the call site.

Hereafter, a more detailed description of the procedure of the algorithm will be presented. The algorithm is a forward data flow algorithm which operates on the control flow graph of the varargs subroutine. A control flow graph, as is commonly used in program optimization, is a graph in the mathematical sense: a collection of nodes, called basic blocks, which represent sequences of program statements; and a collection of edges, which represent the passing of control from one basic block to another. The algorithm used herewith also requires that forward and back edges and loops in the control flow graph have been identified by some prior analysis, for instance, interval analysis.

The algorithm associates three abstract tuples $IN_B$, $Local_B$, and $OUT_B$ of the form (i, s), a join function $J_B$ and a transfer function $T_B$ with each basic block B in the subroutine. In the tuples, i and s denote the following, depending on the purpose the tuple serves:

$IN_B$: i represents a lower bound on the number of the next vararg to be accessed on entry to this basic block, and, for basic blocks within loops, s represents the number of vararg accesses performed on one iteration of the loop;

$Local_B$: i represents the number of va_arg statements in the basic block and s is always set to 0;

$OUT_B$: i represents a lower bound on the number of the next vararg to be accessed on exit from this basic block, and, for basic blocks within loops, s represents the number of vararg accesses performed on one iteration of the loop;

The tuples can also be set to special values of top (T), representing that no information is known about the proper values for i and s, and bottom ($\bot$) representing that there is conflicting information about the proper values. In mathematical terms the tuple values can be viewed as elements of a lattice.

The join function $J_B$ computes $IN_B$ from all the predecessors of basic block B, while the transfer function $T_B$ computes $OUT_B$ from $IN_B$ and $Local_B$. The exact form of $J_B$, which is a monotone function that accepts N tuples as arguments and produces a tuple as a result, depends upon the number (N) and kind of incident flow graph edges (whether forward-edge or backedge) for the basic block. The data flow algorithm is thus represented as a simultaneous system of equations (two for each basic block B in the control flow graph of the subroutine) of the form:

$$IN_B = J_B(OUT_{BP1}, OUT_{BP2}, \ldots, OUT_{BPn})$$

$$OUT_B = T_B(IN_B, Local_B)$$

where $OUT_{BP1}, OUT_{BP2}, \ldots, OUT_{BPn}$ are the OUT tuples from the predecessor basic blocks of B. The manner will now be described as to how to precisely determine the form of $J_B$ for each basic block B in the control flow graph. The description is broken out into a number of cases which collectively describe $J_B$ for all possible situations.

First, if B is an entry block in the graph (has no predecessors), then $J_B=T$. This simply means that on entry to the routine, there is no information as to the state of the varargs accesses.

If B is a block with exactly one predecessor block B', then $J_B=OUT_{B'}$. This means that if there is only one possible predecessor of B in all paths, then the state of the varargs accesses on entry to B is the same as the state of the varargs accesses leaving B'.

Now consider the cases where B has $N \geq 2$ predecessors in the control flow graph. The predecessor blocks will hereafter be referred to as B1 and B2. The following table describes the details of $J_B$ when N=2, and it can easily be generalized for any N>2 because $J_B$ is associative.

TABLE 1

| Out Value $J_B$ | Value of Out from B1 | | | |
|---|---|---|---|---|
| B2 | T | (i1, s1) | | ⊥ |
| T | T | (i1, s1) | | ⊥ |
| (i2, s2) | (i2, s2) | X | | ⊥ |
| ⊥ | ⊥ | ⊥ | | ⊥ | where X is computed differently for the following three different cases:

Case 1. B1 and B2 are both forward-edge predecessors of B: if B1 and B2 and B are in the same interval then if (i1=i2 and s1=s2) then X=(i1, s1)

else X=⊥ else either B1 or B2, or both are not in the same interval as B if (i1=i2 and s1=0 and s2=0) then X=(i1, S1)

else X=⊥

This case essentially says that if all paths leading into B agree on what the next varargs access will be, and the blocks in the path immediately before B are in the same loop as B is, then at the entry of B it is known what the next access will be; otherwise no information is available.

Case 2. B1 and B2 are both backedge predecessors of B:

if (i1=i2 and s1=s2) then X=(i1, s1)

else X=⊥

This case is similar to case 1.

Case 3. B1 is a forward-edge predecessor of B and B2 a backedge predecessor of B:

X=(i1, i2−i1)

This case says that if the varargs accesses have been followed around a loop, then it is known how many varargs accesses will occur within the loop as a whole.

There is a need to specify the form of $T_B$ for each block. In blocks that do not contain any varargs accesses, $T_B=IN_B$. This means that if there are no varargs accesses in the block, the state of the varargs accesses are not changed by executing the statements in the block. If a va_start appears in a block with no other varargs accesses, then $T_B=(0,0)$ ; this says that if the block initializes varargs accesses, then at exit from the block the next vararg to be accessed is the first vararg. If a va_end appears in a block with no other varargs accesses, then $T_B=T$; this means that once again there is no information as to what the state of varargs accesses are. Finally, if some number p of va_arg statements appear in a block with no other varargs access, then the table below describes the transfer function $T_B$:

TABLE 2

| | Values of $IN_B$ | | |
|---|---|---|---|
| $T_B$ | T (p, 0) | (i1, s1) (i1 + p, s1) | ⊥ ⊥ |

It is also possible to handle cases where a single block contains a mixture of va_start, va_arg, and va_end statements; such extensions are straightforward.

Once $J_B$ and $T_B$ have been determined for each block, the analysis technique can create a set of 2Q equations in 2Q unknowns (the IN and OUT tuples for each block), where Q is the number of basic blocks in the control flow graph. The solution set to these equations can be found by standard dataflow techniques such as iteration to fixed point: first setting the IN and OUT tuples for each block to T, and then repeatedly evaluating the equations, updating the value of the tuples, until all tuple values stabilize at a mutual fixed point.

When a solution is found, a varargs subroutine is deemed to be clonable by peeling, if all basic blocks containing va_arg statements are associated with IN tuples that contain integer values for i and s. The values of i and s can later be used during transformation of a vararg access to determine the actual argument that a particular va_arg statement will access.

ILLUSTRATIVE EXAMPLE

To further illustrate these ideas, a description follows as to how the analysis works on the subroutine "printargs" presented above and shown in the control flow graph of FIG. 1. The graph contains three basic blocks (B1, B2, and B3) and 4 edges. Via interval analysis or another loop detection scheme, the edge from B2 to B2 is determined to be a backedge and block B2 is noted as being in a loop by itself.

For block B1, $J_{B1}=T$. This is so because B1 is an entry block and has no predecessors. $T_{B1}=(0,0)$ because block B1 contains a va_start statement and no other varargs accesses.

For block B2, $J_{B2}$ follows the form of Table 1, with $X=(OUT_{B1,i}, OUT_{B2,i}-OUT_{B1,i})$, following case 3, since one predecessor (B1) is a forward-edge predecessor, and the other (B2) is a backedge predecessor. $T_{b2}$ follows the form of Table 2 with p=1, since there is one va_arg statement in the block.

For block B3, $J_{B3}$ follows the form of Table 1, with X determined by case 1, part 2. This is so because the predecessor B2 is in a loop that does not also contain B3. In B3, $T_{B3}=T$ because B3 contains a va_end statement and no other varargs accesses.

The system of equations to solve is given by:

$IN_{B1}=T$ $OUT_{B1}=(0,0)$ $IN_{B2}=J_{B2}(OUT_{B1,} OUT_{B2})$ $OUT_{B2}=T_{B2}(IN_{B2,} (1,0))$ $IN_{B3}=J_{B3}(OUT_{B1,} OUT_{B2})$ $OUT_{B3}=T$

Such a system can be solved by first setting all unknowns to T and then repeatedly evaluating various equations until a fixed point is reached. In this case, the solution is $IN_{B1}=T$
$OUT_{B1=}(0, 0)$
$IN_{B2}=(0,1)$
$OUT_{B2}=(1, 1)$
$IN_{B3}=\bot$
$OUT_{B3}=T$ Block B2 is the only block in the subroutine that contains a va_arg statement. Because the solution (0,1) for $IN_{B2}$ contains integer values for both i and s, the varargs subroutine printargs is clonable.

Transformation Phase

Given that the analysis phase has determined that a varargs subroutine is clonable, the task of the transformation phase is to translate the varargs subroutine into a set of fixedarg clone subroutines which can be invoked at different call sites. This task is accomplished by the following three major steps: group formation, loop peeling, and varargs access replacement.

Clone Site Selection and Clone Group Formation

Different numbers and types of arguments can be passed to the varargs subroutines at different call sites. This first step of the transformation phase partitions the call sites into different groups, each of which can share the same clone of the varargs subroutine. Information needed to perform this grouping may be determined, for instance, from the call graph built by the compiler, or some other means of gaining knowledge about the callers of the varargs subroutine.

Each group describes those call sites that pass the same number and type of argument values. For instance, given the following call sites to a varargs subroutine "a", 11:a(33);
12:a("hello", 5, 6.2);
13:a(21);
14:a(19, 45, 0.3)
15:a("abcd", 3, 2.2);
16:a(1, 2, 3, 4);

sites 11 and 13 can call the same clone, since they both pass one argument, and the argument in both cases is of integer type. Similarly, sites 12 and 15 can call the same clone, since they both pass 3 arguments of type string, integer, and floating-point, respectively. Site 14 and site 16 each form their own group.

Once the groups are formed, an exact copy (clone) of the varargs subroutine will be created for each group. Then the call sites in each member of the group are modified to call the appropriate clones instead.

At this point a number of exact clones of the original varargs subroutine have been constructed. But, unlike the original subroutine, each of these clones has the property that it is only called at sites that pass the same number and type of arguments.

Loop Peeling

The next step is to make each instance of va_arg in the clones of the varargs subroutine refer to a separate varargs argument, so that the va_arg expression can be replaced with the name of the corresponding fixed argument. Recall that the earlier analysis phase is designed to guarantee that this is possible. However, the compiler might need to restructure the subroutine using loop peeling first.

When a vararg access occurs in a loop, it represents multiple instances of vararg access as the loop iterates. By peeling off the iterations of the loop, these vararg access instances are made explicit. The peel factor (the number of iterations to be peeled off from the loop) is determined by the number of actual varage parameters which are passed in by the callers in each partition. For example, the following is a restructured clone of printarge corresponding to callers that pass 3 arguments (one fixed argument and two vararge, like call site 3). The clone has been restructured by peeling two iterations from the loop.

```
void printargs_peel_2(int arg_cnt, . . . )
{
    int i;
    va_list pvar;
    va_start(pvar, arg_cnt);
    if ( 0 < arg_cnt ) {
        printf("arg[%d] = %d\n", i, va_arg(pvar, int));
        if ( 1 < arg_cnt ) {
            printf("arg[%d] = %d\n", i, va_arg(pvar, int));
            for (i = 2; i < arg_cnt; i++) {
                printf("arg[%d] = %d\n", i, va_arg(pvar, int));
            }
        }
    }
    va_end(pvar);
}
```

The peeling has created two new va_arg expressions which will always refer to the first and second vararge arguments, respectively. The original loop and vararge access remain during this peeling operation, but the loop has its lower bound adjusted to account for the iterations that have been peeled out. This peeling step is not required if the vararge subroutine does not contain any loops.

At the end of this step, it is guaranteed that the va_arg expressions in each clone subroutine either access distinct vararge arguements, or access arguments beyond the end of the vararge arguements passed by the caller (nonexistent arguements).

Vararge Accesses Repalcement

The fianl step of the transformation is to transform the clone of the vararge subroutine into a fixedarg subroutine and to replace all the vararge access instances with access to a corresponding fixed argument. First the signature of the vararge subroutine is replaced with a fixedarg signature. This new signature is created by considering the number and type of arguements passed by the callers of the clone (recall that all these callers come from the same group and threfore agree on both number and type of arguements). For example, the signature to call the clone of subroutine a from the group containing sites 11 and 13 would be

```
void a(int arg1)
``` since all callers (the subroutine containing sites 11 and 13) pass exactly one integer arguement.

Then each va_arg expression is replaced with a reference to the corresponding fixed arguement. During this replacement, the type of the entity accessed by a vararge access is checked against that of the fixed formal arguement to ensure that they match. If a mismatch is detected the compiler can abort the transformation and a warning message can be generated.

A version is shown below of printargs that can be called by sites like call site 3 which pass exactly three integer arguement. Note that no varargs accesses remain and that the routine now has a fixedarg signature. Calls to this clone will be processed more efficiently than calls to the original printargs subroutine, and will have exactly the same behavior for standards-conforming programs.

```
    void printargs__peel__2__fixed(int arg__cnt, int f1, int f2
)
    {
        if ( 0 < arg__cnt ) {
            printf("arg[%d] = %d\n", i, f1);
            if ( 1 < arg__cnt ) {
                printf("arg[%d] = %d\n", i, f2);
                if ( 2 < arg__cnt ) {
                    error("improper use of varargs");
                }
            }
        }
    }
```

In general, after peeling with factor N, there will be N+1 va__arg statements in the routine (assuming each loop iteration contains one varag access statement). The first N corespond to the expected arguments and are replaced as above; the N+1st corresponds to the case where the caller and callee do not agree on the number of arguments expected. If the language standard specifies that such an N+1st vararg access has undefined results (as is true in C) it can simply be replaced with some suitable constant value like 0. Alternatively, the complier may wish to insert code (as in the example above) that will cause an error if this part of the program is ever executed so that the programmers can correct the error.

If a complier is willing to tolerate larger amounts of code expansion, the number of candidates for varargs cloning can be increased by handling casse where different paths through the code may access different numbers of varargs. The extension of the analysis and transformation phases to such cases is straightforward. The varargs statements may also be used in more complicated fashions than illustrated by the examples. For instances, there may be several simultaneous or disjoint transversals of the varargs list. Such cases can also be handled straightfowardly by the above-described techniques.

It should be understood tha the foregoing description is only illustrative of the invention. Various alternatives and modifications can be devised by those skilled in the art without departing from the invention. Especially important in this regard is that fixedarg subroutines can be inclined, while varage subroutines cannot be inclined. Accordingly, the present invention is intended to embrace all such alternatives, modifications and variances which fall within the scope of the appended claims.

What is claimed is:

1. A computer-implemented method for analyzing a program listing to identify a first set of subroutine therein, each of which accepts a variable number of arguments, and for converting said first set of subroutines into further sets of subroutines which accept fixed numbers of arguments, said computer-implemented method comprising the steps of:
    a) locating subroutines in said program listing which accept a variable number of arguments and identifying which thereof comprise a first set of subroutines that can be altered to a form which accept a fixed number of arguments;
    b) for each subroutine identified as part of said first set, determining call sites which pass arguments to each said subroutine and determining a number and kind of said arguments to be passed therefrom;
    c) partitioning call sites to each said subroutine of said first stet into one or more groups, each group comprising call sites which pass an identical number and kind of arguments to an associated subroutine of said first set;
    d) duplicating each said subroutine of said set into plural second sets of N corresponding subroutines, wherein N for each second set is an integer equal to the number of groups associated with said subroutine of said first set, and revising each one of said N corresponding subroutines to receive a number of fixed arguments to be passed by call sites partitioned into an associated group; and
    e) substituting in said program listing said N corresponding subroutines and revising call sites in each said group to refer to an associated one of said N corresponding subroutines.

2. The computer-implemented method as recited in claim 1, wherein step a) classifies a subroutine into said first set if each argument reference in said subroutine refers to only one argument.

3. The computer-implemented method as recited in claim 1, wherein step a) classifies a subroutine into said first set, if statements in said subroutine that refer to multiple arguments appear inside a loop that can be peeled to create duplicate statements that each refer to exactly one argument.

4. The computer-implemented method as recited in claim 1, wherein step d) creates a duplicate of a subroutine by peeling, wherein said peeling revises statements in said subroutine that appear inside a loop and refer to multiple arguments by creating duplicate statements which each refer to exactly one of said arguments.

5. A computer program product for controlling a processor to analyze a program listing to identify a first set of subroutine therein, each of which accepts a variable number of arguments, and to converting said first set of subroutines into further sets of subroutines which accept fixed numbers of arguments, said computer program product comprising:
    a) means for controlling said processor to locate subroutines in said program listing which accept a variable number of arguments and to identify which thereof comprise a first set of subroutines that can be altered to a form which accepts a fixed number of arguments;
    b) means for controlling said processor to determine call sites which pass arguments to each said subroutine, for each subroutine indentified as part of said first set, and to determine a number and kind of said arguments to be passed therefrom;
    c) means for controlling said processor to partition call sites to each said subroutine of said first set into one or more groups, each group comprising call sites which pass an identical number and kind of arguments to an associated subroutine of said first set;
    d) means for controlling said processor to duplicate each said subroutine of said first set into plural second sets of N corresponding subroutines, wherein N for each second set is an integer equal to the number of groups associated with said subroutine of said first set, and to revise each one of said N corresponding subroutines to receive a number of fixed arguments to be passed by call sites partitioned into an associated group; and
    e) means for controlling said processor to substitute in said program listing said N corresponding subroutines and to receive call sites in each said group to refer to an associated one of said N corresponding subroutines.

6. The computer program product as recited in claim 5, whrein means a) classifies a subroutine into said first set if all argument references in said subroutine refer to only one argument.

7. The computer program product as recited in claim 5, wherein means a) classifies a subroutine into said first set, if statements in said subroutine that refer to multiple arguments appear inside a loop that can be peeled to create duplicate statements that each refer to exactly one argument.

8. The computer program product as recited in claim 5, wherein means d) creates a duplicate of a subroutine by peeling, whrein said peeling revises statements in said subroutine that appear inside a loop and refer to multiple arguments, by creating duplicate statements which each refer to exactly one of said argumetns.

* * * * *